No. 776,509. PATENTED DEC. 6, 1904.
J. GOOD.
ROPE MACHINE.
APPLICATION FILED JAN. 12, 1901. RENEWED MAY 7, 1904.
NO MODEL. 3 SHEETS—SHEET 3.
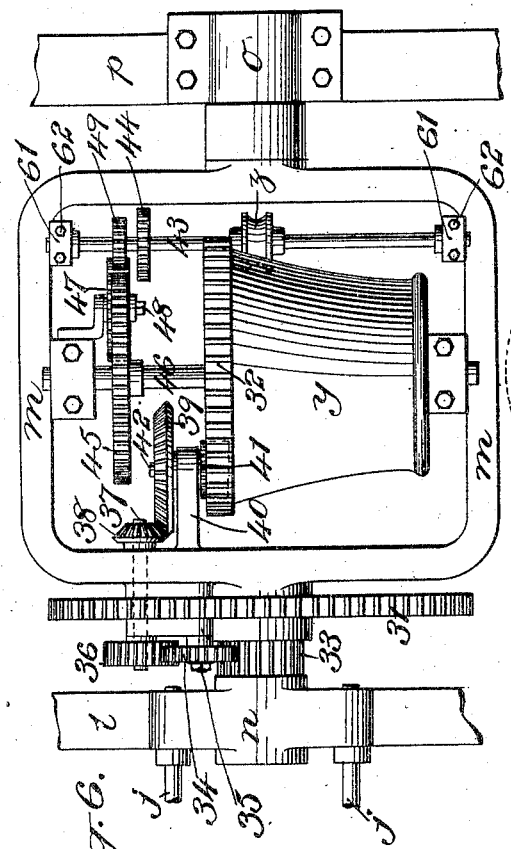
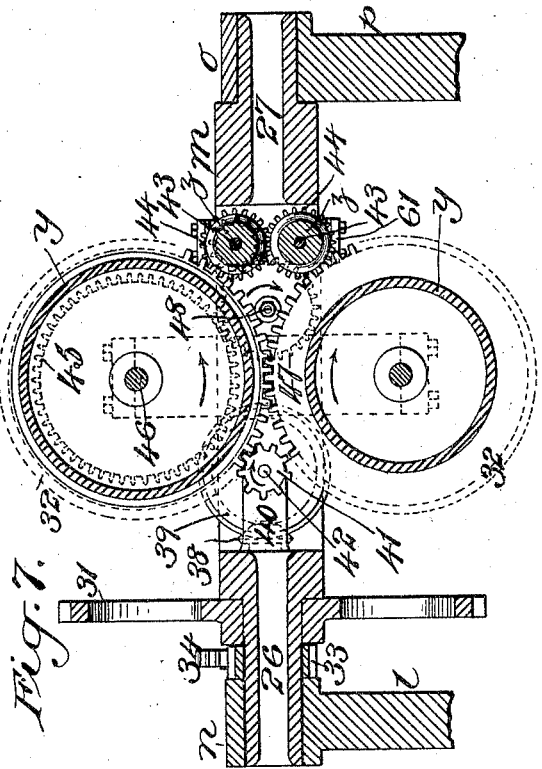
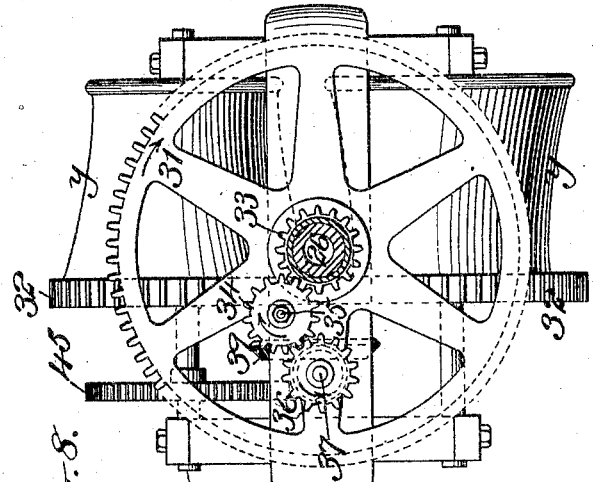
Witnesses:
George Barry Jr
Henry Thieme
Inventor:
John Good
by attorneys
Brown & Heward No. 776,509.

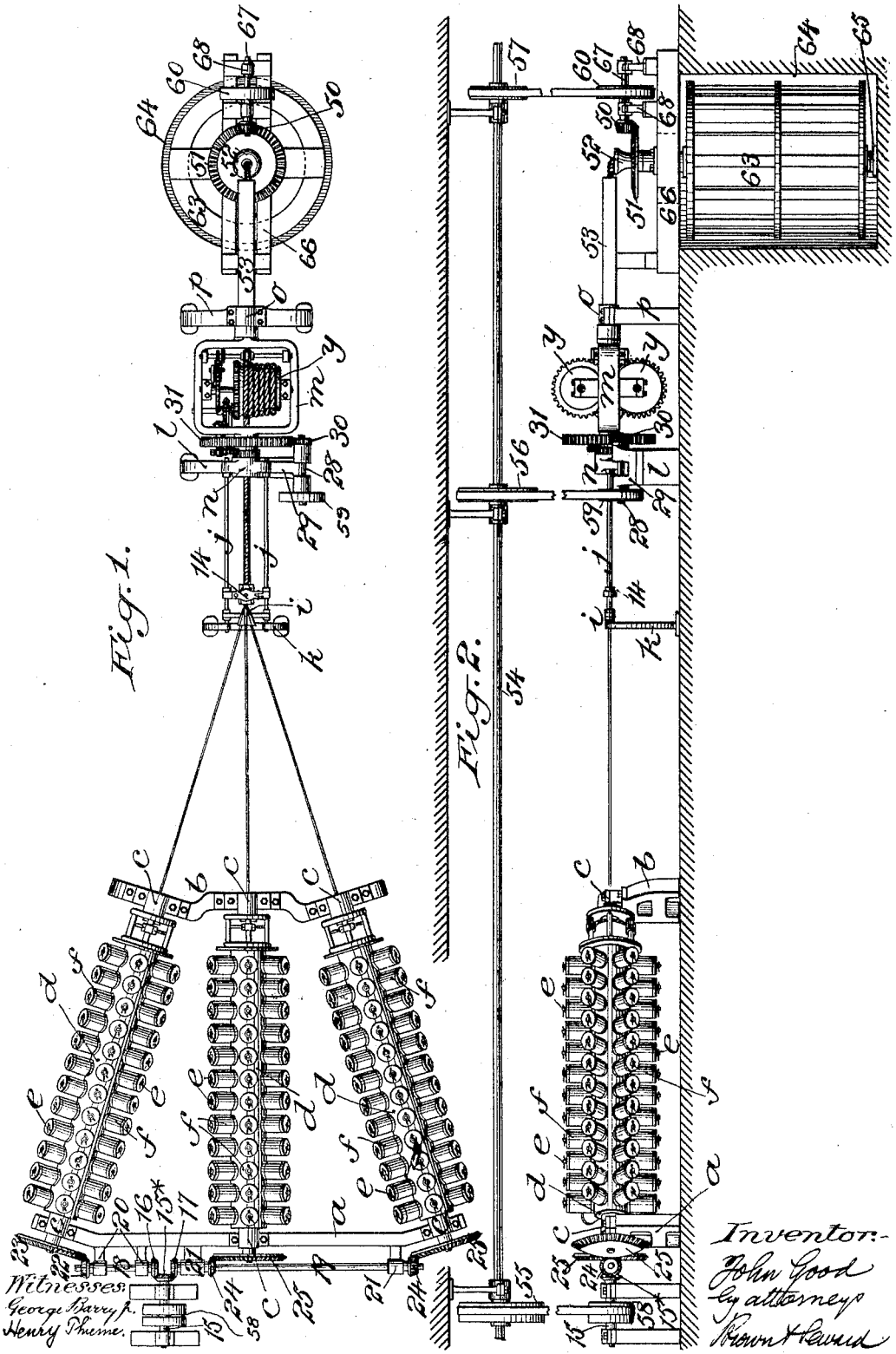

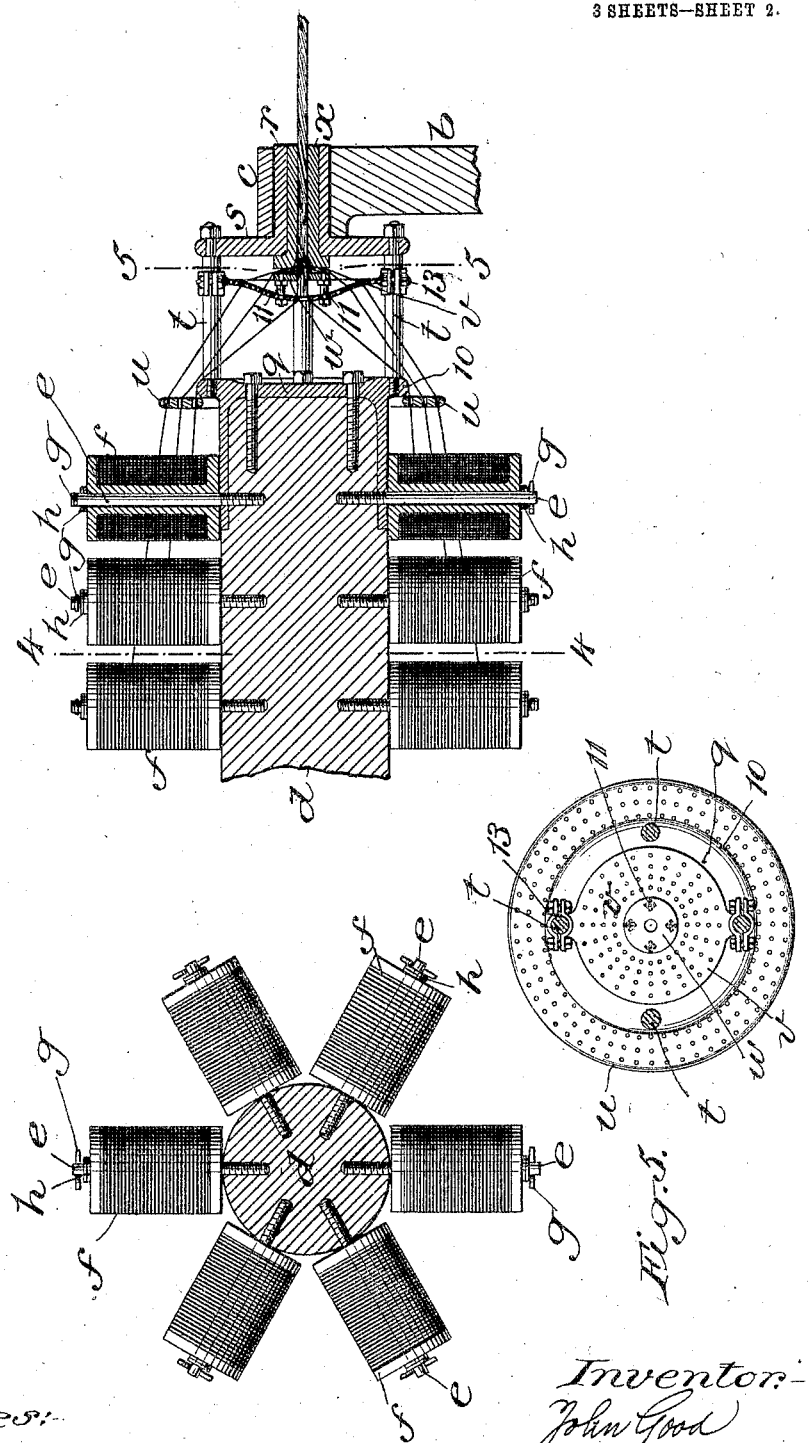

Patented December 6, 1904.

UNITED STATES PATENT OFFICE.

JOHN GOOD, OF FAR ROCKAWAY, NEW YORK, ASSIGNOR, BY DIRECT AND MESNE ASSIGNMENTS, TO THE JOHN GOOD CORDAGE CO., A CORPORATION OF NEW YORK.

ROPE-MACHINE.

SPECIFICATION forming part of Letters Patent No. 776,509, dated December 6, 1904.

Application filed January 12, 1901. Renewed May 7, 1904. Serial No. 206,935. (No model.)

*To all whom it may concern:*

Be it known that I, JOHN GOOD, a citizen of the United States, and a resident of Far Rockaway, in the county of Queens and State of New York, have invented an Improvement in Rope-Machines, of which the following is a specification.

A rope-machine embodying my invention performs by a continuous process the operations of twisting yarns together to form strands and of laying the so-formed strands together to form a rope; and my improvement consists in the means hereinafter described and claimed whereby the said operations are performed.

In the accompanying drawings, forming part of this specification, Figure 1 represents a plan of a rope-machine embodying my invention; Fig. 2, a side elevation of the same; Fig. 3, a longitudinal sectional view, on a larger scale than Figs. 1 and 2, of a part of one of what I call the "strand-forming spindles" and of some of its attached yarn spindles and bobbins; Fig. 4, a transverse section taken approximately in the line 4 4 of Fig. 3; Fig. 5, a transverse section taken in the line 5 5 of Fig. 3; Fig. 6, a plan of the flier by which the strands are laid into rope; Fig. 7, a central longitudinal section of the same, and Fig. 8 a rear end view of the same.

$a$ $b$ designate standards which contain stationary bearings $c$ $c$ for the journals of what I call the "strand-forming spindles" $d$, by the rotation of which numerous spun yarns are formed into strands. These spindles, of which there are three represented, are so arranged, as shown in Fig. 1, that their axes converge toward a fixed point. The said spindles, the bodies of which may be of wood, have radially secured to them, as shown in Fig. 3, the spindles $e$, on which are loosely arranged the yarn-bobbins $f$. Of these bobbins there may be any suitable number according to the size of the yarns and of the strands to be produced therefrom. The spindles $e$ and their bobbins $f$ are arranged in several rows, of which there may be any suitable number in each row. For example, in the machine represented there are six rows and twelve in each row. The spindles $e$ are represented as screwed into their respective central spindle $d$, and the bobbins are represented as retained on their spindles $e$ by pins $g$, inserted through the spindles, and washers $h$ on the spindles between said pins and the outer heads of the bobbins.

At the fixed point toward which the axes of the strand-forming spindles converge there is arranged a stationary conductor, represented as what is known as a "laying-top" $i$, such as is common in rope-machines, which is carried by rods $j$, which are supported in standards $k$ and $l$, the latter of which contains the bearing $n$ for one of the journals of the laying-flier $m$, by the rotation of which the strands produced from the yarns by the rotation of the strand-spindles are laid into rope. The bearing $o$ for the other journal of the laying-flier is on a standard $p$. The rods $j$ also support a nipper 14, which is like the nipper commonly employed in rope-machines, its two jaws together having their interior the female counterpart of the exterior of the laid rope. Before describing the laying-flier in detail I will describe with particular reference to Figs. 3 and 5 the devices provided at the delivery end of each strand-spindle for gathering in the yarns to form a perfectly round strand and which constitute what I call the "strand-former."

On the head of each strand-spindle is provided or firmly secured a flange-piece $q$, between which and the front spindle-journal $r$ there is an open space, the said journal, which is hollow, being provided with a flange $s$, which is rigidly connected by parallel rods $t$ with the flange 10 of $q$. At the back of the flange 10 there is firmly secured to the flange-piece $q$ an annular plate $u$, in which are several concentric circular series of holes each large enough for the passage of a yarn from one of the bobbins $f$, the total number of such holes being at least equal to and preferably greater than the number of bobbins, so that there may be no difficulty in finding a hole for every yarn. Between the flange-piece $q$ and the flange $s$ of the journal $r$ there is carried by the rods $t$ a circular plate $v$, in which are several annular series of holes like those in the annular plate $u$ and a larger central hole. To the front of the plate $v$ is secured by studs 11 a small annular plate $w$, the central opening of which corresponds with the central opening in the plate $v$ before mentioned. The hollow journal $r$ is fitted with a smoothly-bored tight bushing $x$, the bore of which is of such caliber that the formed strand may pass through it with some friction. The plate $v$ is secured to two of the rods $t$ by screw-clamps 13, provided on said plate, the said clamps permitting the adjustment of the said plate nearer to or farther from the inner end of the bushing $x$. In the gathering together of the yarns to form a strand all of them pass through the holes in the plate $u$, those for the central portion of the strand passing through the innermost circular series of such holes and thence to and through the central openings in the plates $v$ and $w$, those for the body and exterior of the strand passing through the intermediate and outer series of such holes and thence through corresponding holes in the plate $v$ and between the plate $w$ and inner end of the journal-bushing $x$ and also being collected at the entrance to said bushing, through which they pass together arranged in the orderly manner in which they have been conducted by the holes in the plates $v$ and $w$.

The three spindles $d$ may have rotary motion imparted to them in the same direction by any suitable means. For this purpose I have represented a driving-shaft 15, which carries a bevel-gear 15*, gearing with bevel-gears 16 17 on two transversely-arranged shafts 18 19, running in bearings 20 21, carried by the standard $a$. The shaft 18 also carries a bevel-gear 22, gearing with a gear 23 on the end of one of the spindles $d$, and the shaft 19 also carries two bevel-gears 24, gearing, respectively, with bevel-gears 25 on the ends of the other two spindles $d$.

I will now proceed with the description of the laying-flier with particular reference to Figs. 6, 7, 8. The frame on this flier does not, as is most common in rope-machines, contain a spool or bobbin upon which the rope is collected and which in a machine for the laying of large rope is of great weight and unwieldy when full of rope; but it contains a pair of capstans $y$, by which the rope laid by the rotation of the flier is drawn into it through its hollow journal 26, and a pair of delivery-rollers $z$, by which the rope received from the capstans is delivered through its hollow journal 27 to be coiled in any suitable manner and by any suitable means for transportation. This flier may have rotary motion given to it by any suitable means. I have represented for this purpose (see Figs. 1 and 2) a short driving-shaft 28, running in bearings in a bracket 29 on the standard $l$. This shaft 28 carries a pinion 30, which gears with a spur-gear 31, fast on the flier. The two capstans, which run in bearings in the sides of the flier, are geared together by two spur-gears 32. They are represented as deriving their necessary rotary motion within the flier through the rotation of the flier itself from a stationary spur-gear 33, (see Figs. 6, 7, 8,) which surrounds the journal 26 and is secured in or to the bearing $n$. This gear is geared through a planet-gear 34, running loosely on a stud 35, carried by the flier, with a gear 36 on the outer end of a short shaft 37, which is arranged in a bearing in the end of flier eccentrically thereto, but parallel with the axis thereof. On the inner end of this shaft 37 is a bevel-gear 38, gearing with a bevel-gear 39 on a short shaft 42, arranged transversely to the flier-axis in a bracket-bearing 40 therein. This shaft 42 carries a pinion 41, which gears with one of the capstan-gears 32. The pair of delivery-rollers $z$ are carried by transverse shafts 43, which are arranged in bearings in the sides of the flier, and they are geared together by gears 44. The said delivery-rollers are driven by a gear 45 on the shaft 46 of one of the capstans through an intermediate gear 47, which turns freely on a stud 48, carried on one side of the flier, and which gears with a gear 49 on one of the roller-shafts 43. The caps 61 of the journal-boxes of these shafts 43 have applied to them screws 62 for the purpose of giving the delivery-rollers pressure enough to produce the requisite bite between the rollers to give to the delivered rope a draft sufficient to keep the rope on the capstans taut. For the purpose of collecting and coiling the rope as it is delivered from the flier by the rollers $z$ I have shown an upright open-mouthed rotary skeleton barrel or cage 63, which is arranged in a pit 64 at a short distance from the flier, the said barrel having a lower journal running in a step 65 at the bottom of the pit, and an upper journal 52, which is hollow, running in a bearing carried by cross-beams 66, arranged across the mouth of the pit 64. The rotary motion of the barrel is derived from a horizontal shaft 67, which runs in bearings in standards 68, erected on the cross-beams 66 and which carries a bevel-gear 50, gearing with a bevel-gear 51 on the upper journal 52 of the barrel. Between the hollow flier-journal 27 and the hollow upper journal of the barrel there is a stationary tubular conductor 53.

The driving-shaft 15 for the strand-twisting spindles $d$, the driving-shaft 28 for the flier, and the driving-shaft 67 for the barrel 63 are represented as all deriving their motion from a line-shaft 54, (see Fig. 2,) which carries three pulleys 55, 56, and 57, the pulley 55 being belted to a pulley 58 on the shaft 15, the pulley 56 being belted to a pulley 59 on the shaft 28, and the pulley 57 being belted to a pulley 60 on the shaft 67. It will be understood that the direction of the rotation of the strand-twisting spindles $d$ and that of the flier should be such that the lay of the rope is in the opposite direction to the twist of the strands. In the operation of the machine the twist of the strands takes place between the heads of the spindles $d$ and the nipper 14, and the lay of the rope is produced between the said nipper and the flier, and the delivered rope is coiled loosely within the barrel 63, whence it may be taken by any suitable means.

What I claim as my invention is—

1. In a rope-machine, the combination of a plurality of rotary strand-twisting spindles, stationary bearings for said spindles so arranged that the axes of said spindles converge to one point, a plurality of radially-arranged spindles carried by each of said twisting-spindles, a rotary laying-flier, and a stationary conductor arranged between the said twisting-spindles and laying-flier at the point of convergence of the axes of the twisting-spindles, substantially as herein described.

2. In a rope-machine, the combination of a plurality of rotary twisting-spindles having hollow journals and the axes of which converge to one point, a plurality of radially-arranged spindles carried by each of the said twisting-spindles, bobbins on said radially-arranged spindles, a rotary laying-flier, a laying-top between the twisting-spindles and the flier at the point of convergence of the axes of said spindles, means for conducting the yarns from said bobbins to and through the hollow journals of the twisting-spindles, and a nipper between the laying-top and the flier, substantially as herein described.

In testimony that I claim the foregoing as my invention I have signed my name, in presence of two witnesses, this 7th day of January, 1901.

JOHN GOOD.

Witnesses:
FREDK. HAYNES,
GEORGE BARRY, Jr.